US012671239B1

(12) United States Patent
Swanson

(10) Patent No.: US 12,671,239 B1
(45) Date of Patent: *Jun. 30, 2026

(54) HOLDERS FOR STRAPS HAVING HOOKS AND METHODS OF MAKING AND USING

(71) Applicant: James F. C. Swanson, Eagan, MN (US)

(72) Inventor: James F. C. Swanson, Eagan, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,869

(22) Filed: Apr. 12, 2023

Related U.S. Application Data

(62) Division of application No. 16/590,749, filed on Oct. 2, 2019, now Pat. No. 11,646,560.

(51) Int. Cl.
| | |
|---|---|
| *B65H 75/06* | (2006.01) |
| *B65H 75/28* | (2006.01) |
| *B65H 75/40* | (2006.01) |
| *B65H 75/44* | (2006.01) |
| *H02G 11/00* | (2006.01) |

(52) U.S. Cl.
CPC ............. *H02G 11/00* (2013.01); *B65H 75/06* (2013.01); *B65H 75/285* (2013.01); *B65H 75/40* (2013.01); *B65H 75/4476* (2013.01); *B65H 2402/41* (2013.01); *B65H 2701/35* (2013.01); *Y10T 24/39* (2015.01)

(58) Field of Classification Search
CPC ...... B65H 75/06; B65H 75/40; B65H 75/285; B65H 75/4473; B65H 75/4476
See application file for complete search history.

(56) References Cited

U.S. PATENT DOCUMENTS

| | | | | |
|---|---|---|---|---|
| 3,174,702 | A | * | 3/1965 | French .................... B63B 34/63 |
| | | | | 242/405.1 |
| 4,261,529 | A | * | 4/1981 | Sandberg ............... B65H 75/06 |
| | | | | 242/407 |
| 4,586,675 | A | | 5/1986 | Brown |
| 5,526,931 | A | | 6/1996 | White |

(Continued)

FOREIGN PATENT DOCUMENTS

DE       20016486 U1     3/2001

OTHER PUBLICATIONS

Strap Wrap Organizer—4-Pack—Ratchet Cargo Tie-Down Strap Storage—Manages Strap During Use Too! (4, for 2" Wide Straps), retrieved from https://www.amazon.com/Strap-Wrap-Organizer-Ratchet-Tie-Down/dp/B07DNFH5WJ on Oct. 1, 2019, 3 pages.

*Primary Examiner* — Sang K Kim
(74) *Attorney, Agent, or Firm* — Berggren law Offices; William R Berggren

(57) ABSTRACT

A holder for straps includes a base including a body portion and a tail portion, and a waist where the body portion and the tail portion join. The base defines first and second horizontally opposed recesses and a wrap area disposed therebetween. The holder includes engaging structures disposed on opposing sides of the wrap area. The engaging structures can engage with S-hooks, D rings, snap hooks, carabiners and the like. After securing the hook thereof, each strap is wrapped around the base through first and second recesses. Straps can be secured by disposing a loop such as a loop of bungee cord or a tie about the waist and tightening the cord or tie.

14 Claims, 7 Drawing Sheets

(56) References Cited

U.S. PATENT DOCUMENTS

| | | | | |
|---|---|---|---|---|
| 6,142,405 | A * | 11/2000 | Black | H02G 11/02 |
| | | | | 242/402 |
| 6,302,347 | B1 | 10/2001 | Amirault | |
| 6,962,306 | B2 | 11/2005 | West | |
| D640,530 | S | 6/2011 | Perez | |
| 11,646,560 | B2 * | 5/2023 | Swanson | H02G 11/00 |
| | | | | 206/495 |
| 2004/0060842 | A1 | 4/2004 | Gholston | |
| 2004/0074137 | A1 | 4/2004 | Levy | |
| 2007/0039912 | A1 | 2/2007 | Hinkens | |
| 2010/0308182 | A1 | 12/2010 | Lahti | |
| 2012/0118342 | A1 | 5/2012 | Perez | |

* cited by examiner

HOLDERS FOR STRAPS HAVING HOOKS AND METHODS OF MAKING AND USING

The present invention relates generally to a holder for holding, storing, and/or transporting straps. The present invention also relates to methods of making and using the holder.

BACKGROUND

Many different types of cords, ropes, strings, twine, cables, hoses, electrical wire, straps, and other flexible elongated objects are commonly used in both home and commercial settings, for example electrical extension cords, string, twine, hoses, electrical wire, bungee cords, and straps.

Straps are widely used for securing items for transport, recreation, and outdoor activities. Straps may be used to attach and bind items together. Examples of straps include ratchet straps, buckle straps, tie-down (lashing) straps, winch straps, and the like.

Many straps comprise a web with a terminating hook or pair of hooks. The web is in the form of a flat strip or flat tube. The web may comprise nonwoven material or a woven material (webbing). Examples of non-woven materials include leather, metals such as steel, and plastics, as well as fiber-reinforced composite materials such as plastic reinforced with filaments such as tensilized polypropylene, polyester yarn, or glass fiber.

Webbing is a strong fabric woven as a flat strip or flat tube. The webbing may be woven from natural fibers such as hemp, cotton, or linen; or synthetic fibers such as polyamides, polyolefins, rayon, or polyesters.

Despite the benefits they provide, flexible elongated objects can be difficult to store due to their length and because they easily become tangled. Accordingly, flexible elongated objects are often wound or wrapped into a more compact shape, like a circular or flat loop shape, before storing them. Many people simply wind the flexible elongated objects around their arms or hands. However, such an approach may become unwieldy for flexible elongated objects that are particularly heavy, long, thick, etc. and such an approach is inapposite for storage.

Moreover, once the flexible elongated objects have been wound into a more convenient shape, they may easily become unwound from that shape. In particular straps may easily become unwound because their webs have a relatively flat cross-section, thereby enabling coils or windings to slip over one another. Especially problematic are straps whose webs are made of a slippery synthetic material such as synthetic fiber webbing.

In view of the above, it would be advantageous to provide storage holders for storing flexible elongated objects. It would be particularly advantageous if storage holders were effective for storing, transporting, and securely holding straps.

SUMMARY OF THE INVENTION

A holder for holding straps with a hook on at least one end is disclosed. Also disclosed are methods of making and using the holder.

The holder has two aspects, an article aspect and a method of using aspect. The article aspect is a holder that comprises three elements, a base, a first array of engaging structures, and a second array of engaging structures. The base comprises a body portion, a tail portion, a lower end of the base, and top and bottom major surfaces defining a thickness between them. The body portion has opposing upper and lower ends and opposing first and second edges, and the tail portion is attached to the lower end of the body portion to form an attachment and extended to the lower end of the base. The attachment is a locally minimum width in the base that further defines a waist. The base defines a first recess in the upper end of the body portion and a second recess in the lower end of the base and with an acute trapezoidal shape, wherein the top surface includes a first wrap area between the first recess and the second recess and the bottom surface includes a second wrap area between the first recess and the second recess. The first array of engaging structures is attached to the top surface of the body portion between the first edge and the first wrap area and extending away from the top surface. The second array of engaging structures is attached to the body portion between the second edge and the first wrap area and extending away from the top surface.

Also provided is a method aspect of holding a hook-terminated strap on a holder. The method comprises five steps. The first step is providing the holder as described above and at least one hook-terminated strap. Another step is engaging the hook with an engaging structure. Another step is positioning the strap so that it passes, in order, from the attaching element over the waist to the second recess. Still another step is positioning the strap so that it further passes, in order, through the second recess, over the waist, through the first recess, and over the waist. Another step is repeating step (iv) any number of times from 0 to 30 times.

The invented holder has several benefits. It is compact and easy to use comprising protrusions extending outward form a base that permit a strap to be releasably fastened to a protrusion and wound about the base in a compact manner. Embodiments containing a longitudinal divider attached to the base between the two arrays of engaging structures enhance orderly wining of the strap with successive straps. A loop attached about the waist of the base better secures the strap or straps onto the holder in an untangled manner.

Definitions

Unless otherwise defined, all technical and scientific terms used herein have the same meaning as commonly understood by one of ordinary skill in the art. In case of conflict, the present document, including definitions, will control.

As used herein, the term "webbing" refers to a strip of flexible woven or non-woven material in the form of a flat strip or flat tube, the strip or tube having a length of about 2 feet to more than 20 feet and a width of about ⅔ inch to over 2 inches.

As used herein, the term "strap" refers to webbing including a hook attached to one end of the webbing length; or including two hooks attached at lower ends of the webbing length.

As used herein, unless otherwise specified or dictated by context, the term "hook" includes S-hook, D-ring, snap hook, or carabiner; and the term "hooks" includes one or more S-hooks, one or more D-rings, one or more snap hooks, one or more carabiners, or any combination thereof.

As used herein, the terms "longitudinal axis," "transverse axis," and "vertical axis" refer to three mutually perpendicular axes; and the terms "longitudinal direction," "transverse direction," and "vertical direction" refer to directions along a longitudinal axis, transverse axis, and vertical axis, respectively.

As used herein, the term "waist" refers to a minimum circumference of the base (as described herein), wherein the circumference of the base adjacent to the waist is greater than the circumference of the base at the waist.

As used herein, the term "bungee loop" refers to a length of bungee cord that is curved or doubled over and attached to itself, thereby defining an opening.

As used herein, the term "bungee cord" refers to an elasticized cord. In this context, "elasticized" means capable of resuming its original dimensions after stretching.

As used herein, the term "winding track" refers to a path for winding a long flexible object such as the webbing of a strap around the holder as described herein. The winding track includes the second wrap edge, the second wrap area, the first wrap edge and the first wrap area as described herein.

The term "isosceles trapezoid" refers to a convex quadrilateral with a line of symmetry bisecting one pair of opposing sides. It is a shape that has two parallel or substantially parallel sides and two non-parallel sides of equal length.

As used herein, "lower end of the base" refers to the end of the base opposed to the upper end of the body portion of the base as further described herein.

The terms "comprise(s)," "include(s)," "having," "has," "can," "contain(s)," and variants thereof, as used herein, are intended to be open-ended transitional phrases, terms, or words that do not necessarily but may preclude the possibility of additional acts or structures. The singular forms "a," "and," and "the" include plural references unless the context clearly dictates otherwise. The present disclosure also contemplates other embodiments "comprising," "consisting of," and "consisting essentially of," the embodiments or elements presented herein, whether explicitly set forth or not. Generally and as determined by context, the term "includes," as used in the specification, may be interpreted to mean any of "comprising," "consisting of," or "consisting essentially of."

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of non-limiting examples thereof, flexibility, partition coefficient, rate, solubility, temperature, and the like; intended values include thickness, yield, weight, concentration, length, shape, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

BRIEF DESCRIPTION OF THE DRAWINGS

One or more features or preferred forms of the invention are described in the accompanying drawings. The drawings are described briefly below.

Figure 1:
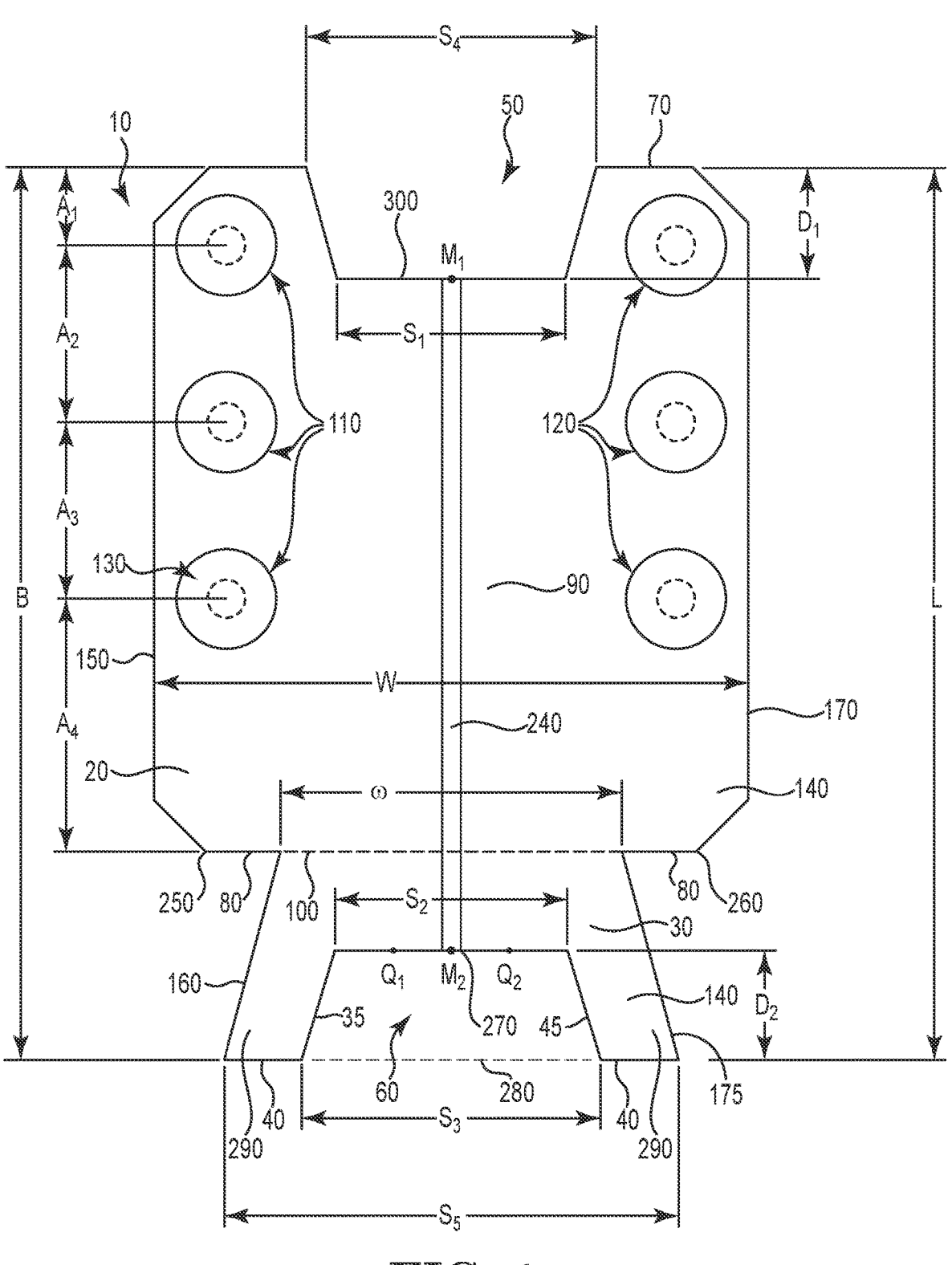
FIG. 1 is prospective view of a holder with a first embodiment of engaging structures with posts topped with round caps in straight lines.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The base comprises top and bottom major surfaces defining a thickness, t, therebetween. The top and bottom surfaces are opposing. In embodiments, the top surface and the bottom surface are coplanar or substantially coplanar. The base defines at least one length on a longitudinal axis, at least one width on a transverse axis, and at least one thickness, t, on a vertical axis and between the top surface and the bottom surface.

The base comprises, consists of, or consists essentially of a body portion and a tail portion. In embodiments, the base is a single piece, i.e., the body portion and the tail portion are not separate pieces joined but each is a portion of the base that is a single piece. In embodiments, the body portion is planar or substantially planar, that defines a single invariant or substantially invariant thickness t.

The body portion defines a first edge and a second edge. The first and second edges are opposing. In embodiments, at least a portion of the first edge is linear or substantially linear and at least a portion of the second edge is linear or substantially linear. In embodiments, the first edge is linear or substantially linear and/or the second edge is linear or substantially linear. In embodiments, the first edge and the second edge are parallel or substantially parallel to each other.

The body portion defines an upper end and a lower end. The upper and lower ends are opposing. In embodiments, at least a portion of the upper end is linear or substantially linear and/or at least a portion of the lower end is linear or substantially linear. In embodiments, the upper end and the lower end are parallel or substantially parallel to each other.

In embodiments, the first edge and the second edge are horizontally opposed in a transverse direction. In embodiments, the upper end and the lower end are horizontally opposed to each other in a longitudinal direction. In embodiments, the top surface and the bottom surface are horizontally opposed to each other in a vertical direction. Stated differently, in embodiments first and second edge are parallel to each other or substantially parallel to each other, and each of first and second edges is perpendicular to or substantially perpendicular to the upper end and the lower end. In these embodiments, the ends (upper and lower ends), the edges (first and second edges), and the surfaces (top and bottom surfaces) are mutually perpendicular or substantially mutually perpendicular. In such embodiments, the first and second edges run in a longitudinal direction or substantially in the longitudinal direction, upper and lower ends run in a transverse direction or substantially in a transverse direction, and upper and lower surfaces are separated by a thickness t in a vertical direction, wherein the longitudinal direction, transverse direction, and vertical direction are mutually perpendicular.

The body portion defines at least one length (on a longitudinal axis) from the upper end to the lower end, at least one width (on a transverse axis) from the first edge to the second edge, and at least one thickness (on a vertical axis) from the top surface to the bottom surface.

The tail portion of the base is attached to the lower end of the body portion. The tail portion and the body portion can form a single piece, or the tail portion and body portion can be separate pieces attached by attachment means. The tail portion extends from the lower end of the body portion and extends to a lower end of the base, wherein the lower end of the base is opposite to the lower end of the body portion within the tail portion.

The base defines a first recess in the upper end of the body portion and a second recess in the lower end of the base. The top surface includes a first wrap area extending longitudinally between the first recess and the second recess. The bottom surface includes a second wrap area extending longitudinally between the first recess and the second recess.

In embodiments, the first recess includes a linear edge, the first wrap edge. The first wrap edge is located where first and second wrap areas abut the first recess.

In embodiments, the second recess includes a linear edge, the second wrap edge. The second wrap edge is located where the first and second wrap areas abut the second recess.

In embodiments, at least one optional divider is affixed longitudinally to the top surface of the body between the first wrap edge and the second wrap edge. The divider further increases orderly winding of a strap about the body of the holder. The divider has a length, height, and thickness. The length is up to the horizontal length of the body between the first wrap and the second wrap. The height generally is less than the engaging structures discussed below for more efficient storage. The thickness is generally sufficient for the divider to remain upright and not bend over easily.

In embodiments, the first wrap edge and the second wrap edges are parallel or substantially parallel to each other. In embodiments, the first wrap edge and the second wrap edge are parallel to or substantially parallel to upper end and lower end of the body portion of the base.

In embodiments, the first wrap edge is linear or substantially linear and defines a first end and a second end and midpoint $M_1$ equidistant between the first end and the second end.

In embodiments, the second wrap edge is linear or substantially linear and defines a first end and a second end and midpoint $M_2$ equidistant between the first end and the second end. In such embodiments, the second wrap edge defines a quarterpoint $Q_1$ that is the midpoint between the first end and $M_2$ and a quarterpoint $Q_2$ that is the midpoint between the second end and $M_2$.

In embodiments, the second wrap edge is parallel or substantially parallel to the waist.

The base defines a waist therein, where the body portion and the tail portion share a boundary (i.e., where they abut). Stated differently, the tail portion is attached to the lower end of the body portion, and the attachment defines a waist. The waist is a locally minimum width in the base in the transverse direction. In embodiments, the waist is a line that is parallel or substantially parallel to the upper end and/or the lower end. In embodiments, the waist is the narrowest width of the base in a transverse direction within a distance of a quarter of an inch, in embodiments half an inch, or in embodiments one inch from the waist.

In embodiments, the waist is perpendicular to a line between $M_1$ and $M_2$.

In embodiments, the first recess has an acute trapezoid shape. In some such embodiments, the first recess has an isosceles trapezoid shape. The trapezoid shape has shorter and longer parallel sides. In embodiments, the longer parallel side is coincident with the upper end of the body portion. In embodiments, the body portion includes a first wrap edge coincident with the shorter parallel side of the recess. However other shapes are possible. For example, in some embodiments the body defines a first recess having a semicircular, rectangular, or square shape.

In embodiments, the second recess has an acute trapezoid shape. In some such embodiments, the second recess has an isosceles trapezoidal shape. The trapezoid shape has shorter and longer parallel sides. In embodiments, the longer parallel side is coincident with the lower end of the base. However other shapes are possible. For example, in some embodiments the tail portion of the body defines a second recess having a semicircular, rectangular, or square shape.

The holder further comprises first and second arrays of engaging structures. In embodiments, the first and second arrays are disposed on opposing sides of the first wrap area, wherein the first array is disposed between the first edge of the body portion and the second array is disposed between the first wrap area and the second edge of the body portion. Stated differently, in embodiments the position of every engaging structure is offset with respect to the winding track.

The engaging structure is a protrusion sticking up from the top surface of the body portion of the holder that is configured to engage with the hook end of a strap as it is wound about the body between the upper end and the lower end. Various embodiments are presented as some examples of engaging structures. In some embodiments, the engaging structure comprises an upright post attached to a top configured to retain a hook from a strap. In some embodiments, the cap of the engaging structure may be round, in some the cap may be a partially round surface with the round part nearest the upper end of the body, and in some embodiments, the cap may be oblong with the protruding horizontal portion extending toward the upper edge of the body. In some embodiments, the engaging structure may be a closed loop, and in some a partially open loop. In some embodiments, the engaging structure may be a cylindrical post topped with bent elbow to form angular hooks or a flat hook. In some embodiments the hooks may be vertically aligned and in some they may be angled off-vertical. Other engaging structures are possible as long as they protrude from the top of the base and are configured to engage hooks of a strap and allow the strap to be wound about the body in the winding area.

In some embodiments, each of the engaging structures in a single array is offset from the winding track by the same amount as the other engaging structures, that is the array is parallel to the winding track and the first and second wrap areas, i.e., the array runs in a longitudinal direction. However, in other embodiments, each of the engaging structures in an array (first array of engaging structures, second array of engaging structures, or both first and second arrays of engaging structures) is offset from the winding track by different amounts. For example, in embodiments each array is disposed in a pattern diagonal with respect to the first and second wrap areas and/or the first and second edges.

In a further example, each array is disposed in an arc about any point on the second wrap edge. In all such embodiments (parallel, diagonal, or arc), each array is offset from the wrap areas and winding track, i.e., is disposed between one of the first and second edges of the body portion and one of the first and second wrap areas.

In embodiments, each of first and second arrays extends in a straight line between the upper and lower ends of the body portion. In embodiments, the first array is proximal the first edge of the body portion and the second array is proximal the second edge of the body portion.

In embodiments, the first array is parallel or substantially parallel to the first edge and/or the second array is parallel to or substantially parallel to the second edge.

In embodiments, the first array, the second array, the first edge, and the second edge are parallel (to each other). In embodiments, each engaging structure extends perpendicularly from the top surface. However, in other embodiments, one or more or all engaging structures do not extend perpendicularly from the top surface. For example, in embodiments each engaging structure extends from the top surface but tilts toward the upper end of the body portion, toward the first edge of the body portion, toward the second edge of the body portion, toward the lower end of the body portion, or combinations of upper or lower and first and second edges.

In some embodiments, the first and second array are attached to the body portion and are a single piece with the body portion. In other embodiments, the engaging structures can be attached to the base by an attachment means.

In embodiments, each engaging structure comprises a post or section extending upward from the top surface of the body. In embodiments, each engaging structure comprises a post and a cap or engaging top. Each post extends in the vertical direction from the top surface of the body portion of the base. In some embodiments, the base and first and second arrays of engaging structures are a single piece, as for example a molded as a single piece of molded plastic. In other embodiments, the engaging structures are attached to the base. In some such embodiments, the post of each engaging structure passes through a hole in the base and is affixed thereto.

PARTS LIST

10. Holder
20. Body portion
30. Tail portion
35. First inner edge of tail portion
40. Lower end of the base
45. Second inner edge of tail portion
50. First recess
60. Second recess
70. Upper end of body portion
80. Lower end of body portion
90. First wrap area
95. Second wrap area
100. Waist
110. First array of engaging structures
120. Second array of engaging structures
130. Engaging structure
140. Base
150. First edge of body portion
160. First outer edge of tail portion
170. Second edge of body portion
175. Second outer edge of tail portion
180. Post of engaging structure
185. Cap of engaging structure
190 Engaging structure with oblong cap
195. Closed loop engaging structure
200. Angled bent cylindrical hook engaging structure
205. Vertically aligned flat hook engaging structure
210. Angled flat hook engaging structure
220. Top surface of base
230. Bottom surface of base
240. Optional divider
250. First terminus
260. Second terminus
270. Second wrap edge
280. Longer parallel side
290. Leg
300. First wrap edge
A. Strap B. S-hook C. Bungee loop D. Bend E. Ring F. Gap G. Eyelet H. Claw I. Weld J. Tip of S-hook

DETAILED DISCUSSION

The holder will now be described in detail with reference to the drawings.

FIG. 1 is a prospective view of a holder with a first embodiment of engaging structures with posts topped with round caps in straight vertically aligned lines. The holder 10 comprises base 140. Base 140 includes a body portion 20 and a tail portion 30. Body portion 20 defines an upper end 70 and a lower end 80, wherein the lower end is horizontally opposed to the upper end. The lower end extends between a first terminus 250 and a second terminus 260. Body portion 20 defines first edge 150 and second edge 170, wherein the second edge is horizontally opposed to the first edge in a transverse direction. In embodiments, body portion 20 defines a rectangular shape or substantially rectangular shape. Examples of substantially rectangular shapes include the shape shown in FIG. 1, wherein body portion 20 defines the shape of a rectangle with triangular corners removed. Another substantially rectangular shape is a shape obtained by rounding the corners of a rectangle. Other shapes are possible, for example a body portion may define a stadium shape elliptical shape, oval shape, polygonal shape, square shape, or a circular shape.

Tail portion 30 projects or extends from lower end 80 of body portion 20 to lower end 40 of the base, wherein lower end 40 is opposed to the body portion. Where tail portion 30 abuts body portion 20, the tail portion is narrower than the body portion in the transverse direction whereby waist 100 is defined where body portion 20 and tail portion 30 abut. Waist 100 is a local minimum in the width of base 140 in the transverse direction. In embodiments shown in FIG. 1, tail portion 30 is not proximal first terminus 250 and is not proximal second terminus 260, and accordingly the base narrows laterally from both sides towards the waist, as shown in FIG. 1.

Moving away from waist 100 in a longitudinal direction toward either upper end 70 or lower end 40, the width of base 140 increases in a transverse direction, for example as shown in FIG. 1.

Tail portion defines first outer edge 160 and second outer edge 175.

Waist 100 is a narrow point in transverse direction in base 140.

In the embodiments shown in the drawings, each of first outer edge 160 of tail portion and second outer edge 175 of tail portion is linear or substantially linear, and first and second outer edges diverge from one another. In the embodiment shown in FIG. 1, the acute angle between first outer edge 160 and lower end 80 of the body portion is 75°, i.e., first outer edge 160 is 15° to the longitudinal direction and the acute angle between second outer edge 175 and lower end 80 is 75° (i.e., 15° to the longitudinal direction). However, in other embodiments, the angle can vary, with the proviso that the first and second outer edges diverge from each other moving towards lower end 40 (i.e., distance between first and second outer edges is greater proximal to the lower end of the base end than proximal to the lower end of the body portion).

In embodiments, the acute angle between the first outer edge and the lower end of the body portion is about 80° to about 89°, in embodiments about 89° to about 25°, in embodiments about 80° to about 30°, in embodiments about 80° to about 40°, in embodiments about 80° to about 50°, in embodiments about 80° to about 60°, in embodiments about 75°, in embodiments about 60° to about 70°, in embodiments about 50° to about 60°, in embodiments about 40° to about 50°, in embodiments about 30° to about 40°.

In embodiments, the acute angle between the second outer edge and the lower end of the body portion is about 80° to about 89°, in embodiments about 89° to about 25°, in embodiments about 80° to about 30°, in embodiments about 80° to about 40°, in embodiments about 80° to about 50°, in embodiments about 80° to about 60°, in embodiments about 75°, in embodiments about 60° to about 70°, in embodiments about 500 to about 60°, in embodiments about 40° to about 50°, in embodiments about 30° to about 40°.

Any of the sharp angles shown in the figures can be radiused. For example, the angle where the lower end 80 of the body portion meets first outer edge 160 and/or second outer edge may be sharp or radiused (rounded).

In some preferred embodiments, base 140 is a single piece, i.e., body portion 20 and tail portion 30 are portions of a single piece, base 140. Accordingly, in such embodiments base 140 can be molded as a single piece.

Base 140 defines a first recess 50 in upper end 70 of body portion 20 and second recess 60 in lower end 40. First recess 50 and second recess 60 are horizontally opposed in a longitudinal direction.

Base 140 includes first wrap area 90 and a second wrap area 95 (not shown in FIG. 1). First wrap area 90 is an area of top surface 220 of base 140, wherein wrap area 90 is located between first recess 50 and second recess 60. First wrap area 90 extends in a longitudinal direction from first recess 50 to second recess 60.

Base 140 also includes a second wrap area 95 (not shown in FIG. 1). The second wrap area is an area of bottom surface 230 of base 140, wherein the second wrap area is located between first recess 50 and second recess 60. Second wrap area 95 extends in a longitudinal direction from first recess 50 to second recess 60.

First wrap area 90 and second wrap area 95 have the same area or substantially the same area as each other.

In embodiments, first wrap edge 300, second wrap edge 270, first wrap area 90 and second wrap area 95 have the same width as each other in a transverse direction.

In embodiments, the first recess 50 has an acute trapezoid shape. In some such embodiments, the first recess 50 has an isosceles trapezoid shape, as shown in FIG. 1. The trapezoid shape has shorter and longer parallel sides. Shorter parallel side corresponds with first wrap edge 300. In embodiments, the longer parallel side is coincident with the upper end 70 of the body portion.

However, other shapes are possible for the first recess. For example, in some embodiments the body defines a first recess having a semicircular, rectangular, or square shape.

In embodiments, as shown in FIG. 1, outer width of tail portion 330 in a transverse direction increases with distance from body portion 20.

First wrap edge 300 defines midpoint $M_1$ and second wrap edge 270 defines midpoint $M_2$. Second wrap edge 270 defines quarterpoints $Q_1$ and $Q_2$, wherein $Q_1$ is midway between $M_2$ and a first end of second wrap edge 270, and $Q_2$ is midway between $M_2$ and a second end of second wrap edge 270.

In embodiments, as for example shown in FIG. 1, base 140 is bilaterally symmetrical about a line drawn between $M_1$ and $M_2$.

In embodiments, the second recess 60 has an acute trapezoid shape. In some such embodiments, the second recess has an isosceles trapezoidal shape as shown in FIG. 1. The trapezoid shape has a shorter parallel side and a longer parallel side 280. In embodiments, the longer parallel side is at the lower end 40, and the shorter parallel side corresponds with second wrap edge 270. However other shapes are possible. For example, in some embodiments the body defines a first recess having a semicircular, rectangular, or square shape. Second recess 60 is entirely located within and defined by tail portion 30 of body 140, wherein shorter side 270 is within tail portion 30.

Base 140 optionally includes one or more dividers 240. The embodiment shown in FIG. 1 includes one divider 240. In embodiments, base 140 comprises one divider, in embodiments two dividers, in embodiments three dividers. Each divider 240 is a ridge protruding in the vertical direction from top surface 220 and/or bottom surface 230, and is disposed longitudinally between first wrap edge 300 and second wrap edge 270. Accordingly, divider(s) 240, when present, divide first wrap area 90 and/or second wrap area 95 into two or more areas disposed longitudinally between first wrap edge 300 and second wrap edge 270. In the embodiment shown in FIG. 1 and FIG. 2, divider 240 runs from first wrap edge 300 to second wrap edge 270. However, in some embodiments divider 240 does not extend the whole length between the wrap edges.

Figure 2:
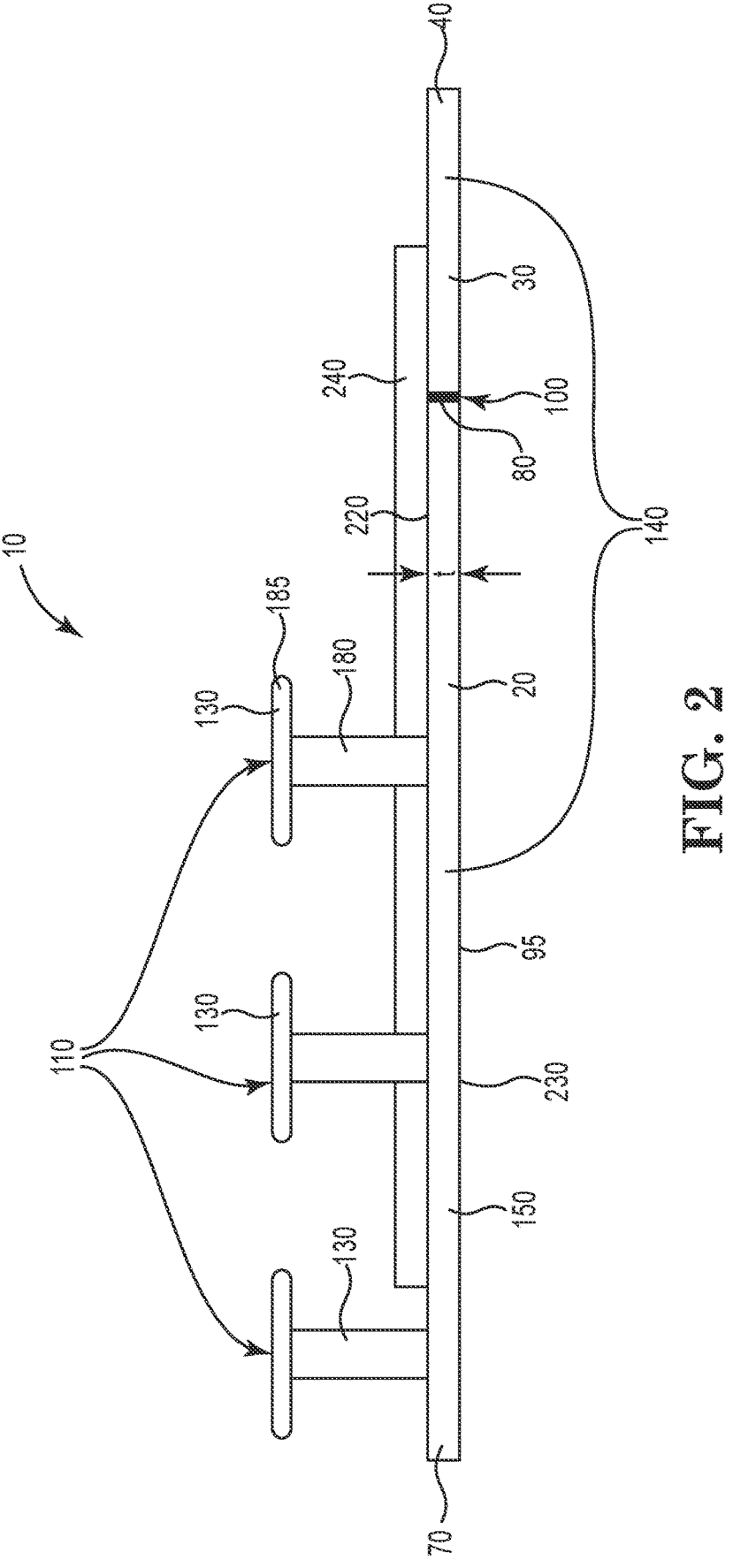
FIG. 2 is a side view of the holder shown in FIG. 1.

FIG. 2 is a side view of the holder shown in FIG. 1. In this figure, the engaging structures are shown extending in a direction perpendicular to the plane defined by the adjacent top surface of the base. However, in other embodiments, as set forth elsewhere herein, the post of one, some, or all of the engaging structures defines an angle of less than 90° to the plane.

Each engaging structure in the embodiment defines a distance from the top end of the engaging structure to the plane defined by the adjacent top surface, the distance termed herein the "height" of a post and the thickness of a cap. In the embodiment shown in FIG. 2, the height of the engaging structures is uniform or substantially uniform in the first array of engaging structures. However, in other embodiments, the height of the engaging structures of the holder is not uniform.

In some embodiments, one or more of the dividers, when present, extends perpendicularly with respect to a plane defined by the adjacent top surface of the base. Each divider defines a distance from the plane to a point, line, or area of the divider opposed to the plane, termed herein the "height" of the divider.

In FIG. 2 divider 240 defines a height less than the height of the engaging structures. However, in some first embodiments that include at least one divider, the at least one divider extends from the top surface of the base to a height equal to or greater than the engaging structures. In such embodiments, any number of the dividers, when present, may have a height equal to or greater than all of the engaging structures. This arrangement has the advantage that the divider or dividers can protect the engaging structures from impact, for example an impact sustained by dropping the holder or an item impacting the holder.

In embodiments, one or more dividers 240 also acts to stiffen base 140 as well as acting as a segregation rail for first wrap area 90 or second wrap area 95. One or more dividers are useful in stiffening the base, and advantageously decrease the flexibility of the base at a given base thickness. This means that the base can be made with a reduced thickness, t, and accordingly from less material thereby reducing cost. As a segregation rail, the divider can assist in keeping straps stored on the device separate and/or untangled.

In some embodiments, base 140 comprises a divider extending from first wrap area 90, a divider extending from second wrap area 95 (not shown in FIG. 1), or a divider extending from first wrap area 90 and a divider extending from second wrap area 95.

The holder further comprises first array of engaging structures 110 and second array of engaging structures 120, wherein each engaging structure 130 of the first array and the second array extends from top surface 220 of base 140. In the embodiment shown in FIGS. 1 and 2, each extends vertically from top surface 220 (in a direction perpendicular or substantially perpendicular to the top surface), and first array of engaging structures 110 and second array of engaging structures 120 are disposed on opposing sides of the first wrap area 90, each array of engaging structures extending between upper end 70 and lower end 80 of body portion 20. However, in some embodiments arrays of engaging structures also extend from bottom surface of the base 230.

In embodiments, holder 10 comprises one array of engaging structures, in embodiments two arrays of engaging structures, in embodiments, three arrays of engaging structures, or in embodiments four arrays of engaging structures. In embodiments a maximum of two arrays extend from the top surface, the bottom surface, or both the top surface and the bottom surface. When two arrays extend from the top surface or the bottom surface, each array of the two is arranged on opposing sides of the wrap area. Stated differently, the entirety of each slot is offset with respect to the winding track, and no part of any slot is located within first and/or second wrap areas.

In the embodiment shown in FIG. 1, first array 110 is proximal first edge 150 and second array 120 is proximal second edge 170. However, first array 110 and second array 120 in embodiments may be further from edges 150 and 170 respectively, with the proviso that the arrays are not located within first wrap area 90.

Figure 3:
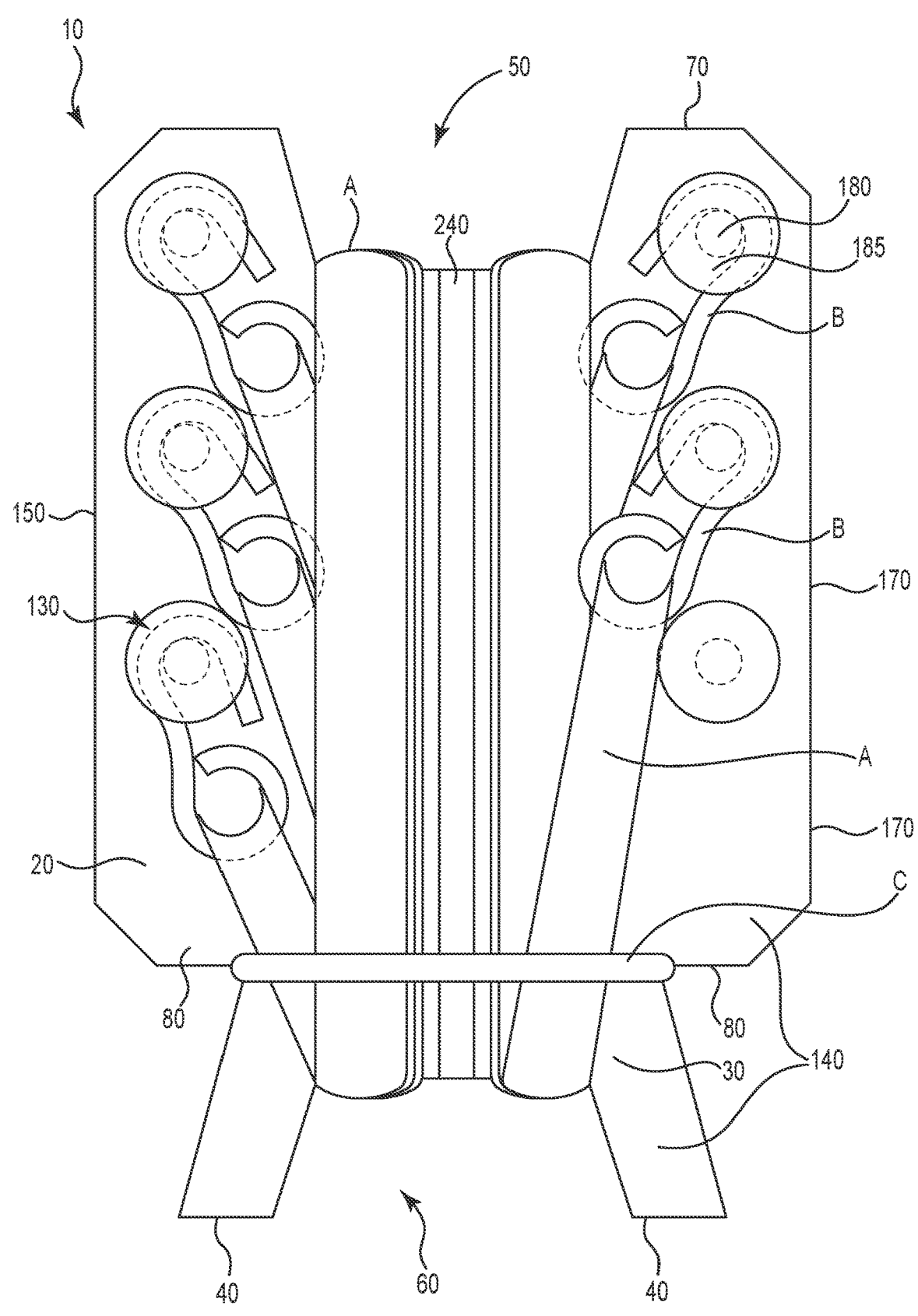
FIG. 3 is a perspective view of a holder with a second embodiment of engaging structures with posts topped with round caps in staggered lines and including a bungee loop and with five strands of a strap wrapped on the holder.

FIG. 3 is a perspective view of a holder with a second embodiment of engaging structures with posts topped with round caps in staggered lines and includes a bungee loop and with five strands of a strap wrapped on the holder. The engaging structures 130 are similar to those of FIG. 1 except each array has a hook of a strap releasably attached.

Figure 4:
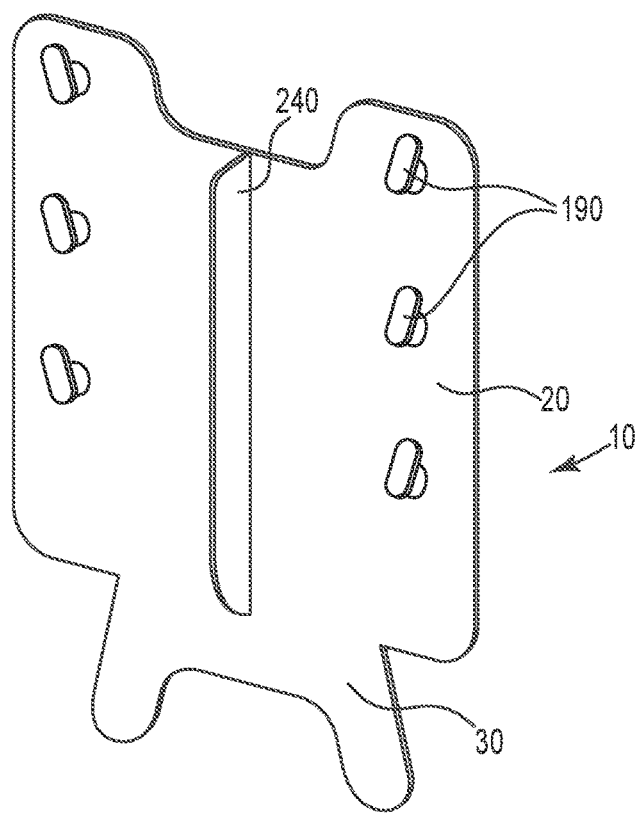
FIG. 4 is a prospective view of a holder with a third embodiment of engaging structures with posts topped with oblong caps.
Figure 5:
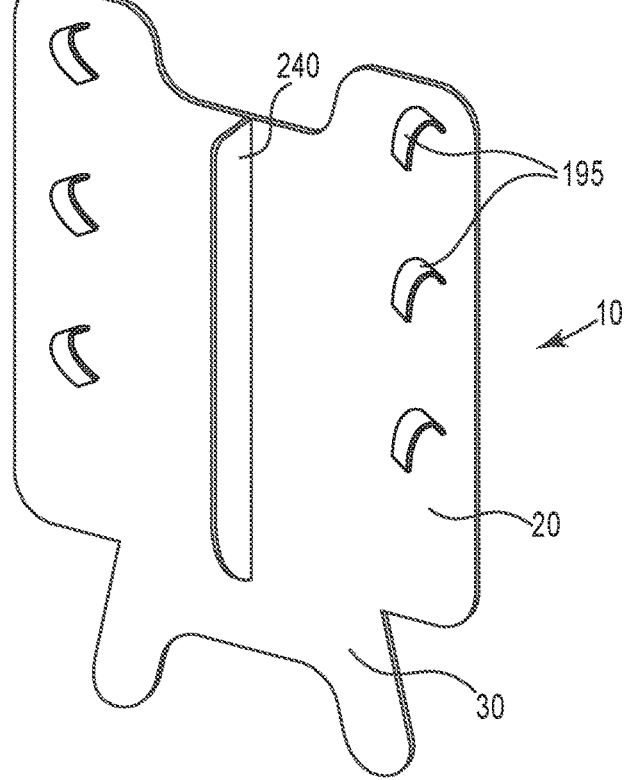
FIG. 5 is a prospective view of a holder with a fourth embodiment of engaging structures of closed loops.
Figure 6:
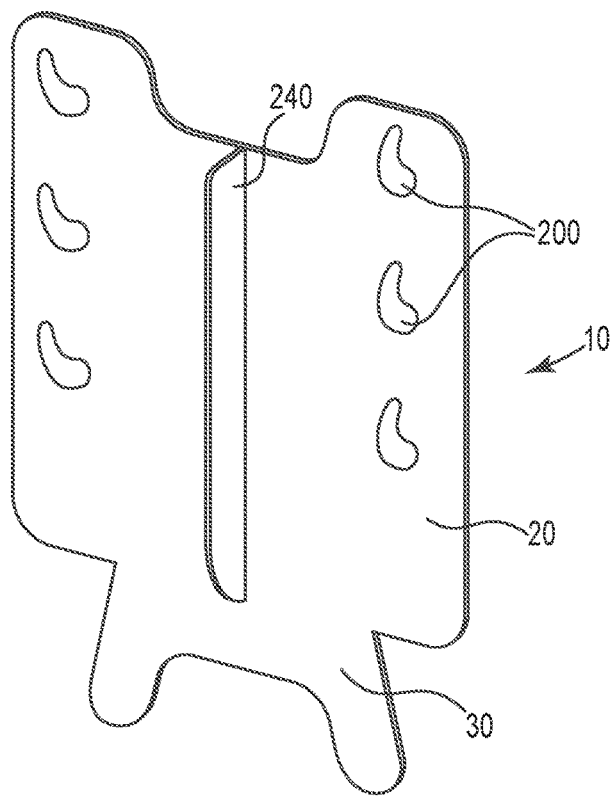
FIG. 6 is a prospective view of a holder with a fifth embodiment engaging structures with cylindrical posts topped with bent elbow to form angular hooks.
Figure 7:
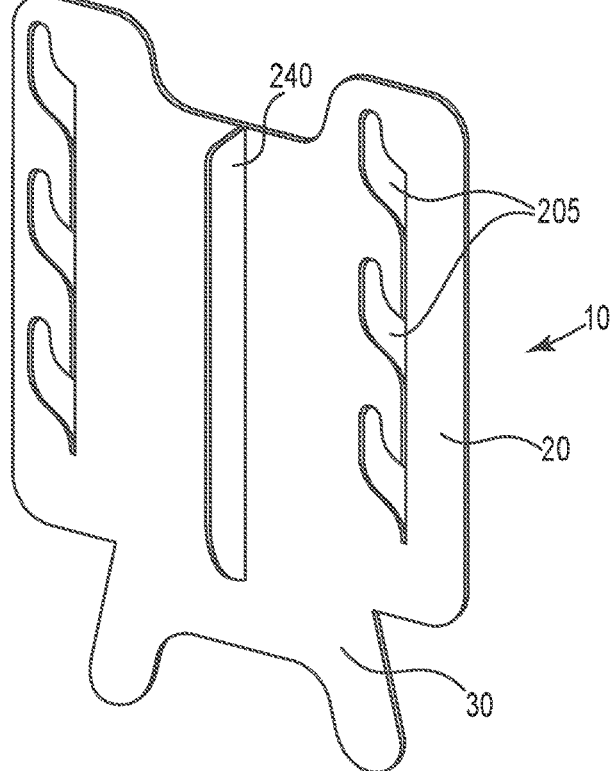
FIG. 7 is a prospective view of a holder with a fifth embodiment engaging structures that are flat with vertically aligned hooks.
Figure 8:
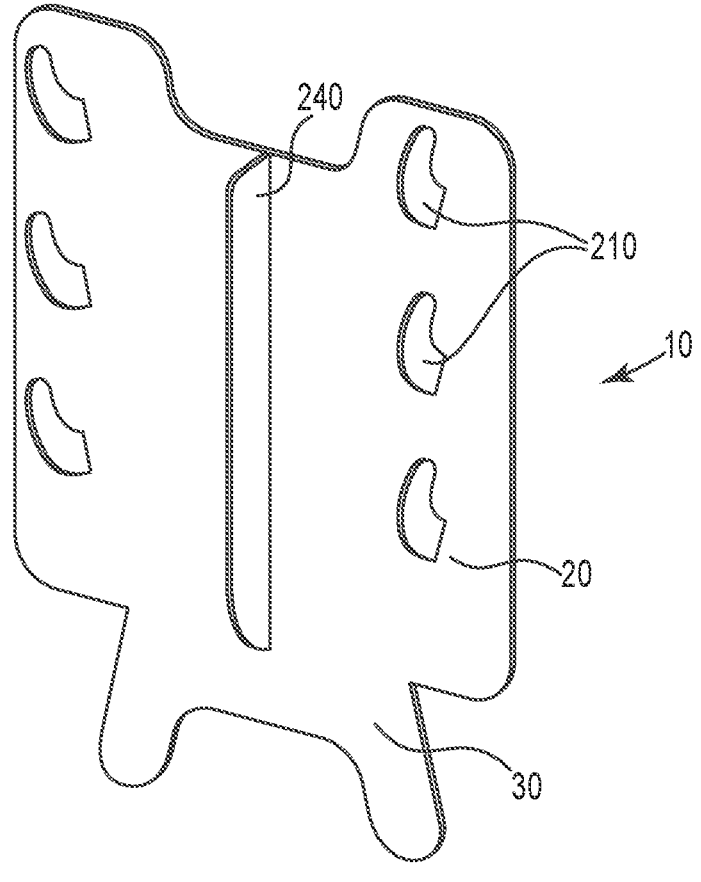
FIG. 8 is a prospective view of a holder with a sixth embodiment of engaging structures that are flat with angled hooks.

FIG. 4 to FIG. 8 show perspective drawings of holders made of one piece of material having engaging structures embodiments with different shapes. FIG. 4 is a holder with a prospective view of a third embodiment of engaging structures with posts topped with oblong caps. The oblong caps point generally toward the upper end of the body. Some embodiments may have the oblong ends tilt outward from vertical. FIG. 5 is a holder with a prospective view of a fourth embodiment of engaging structures of closed loops. FIG. 6 is a holder with a prospective view of a fifth embodiment of engaging structures with cylindrical posts topped with bent elbow to form angular hooks. The hooks are along the line from the quarter point to the center of the post and the angle of each hook from vertical increases slightly as the engaging structures descend downward in each array. FIG. 7 is a holder with a prospective view of a fifth embodiment of engaging structures that are with flat vertically aligned hooks along a line parallel to the nearest outer edge of the body. FIG. 8 is a holder with a prospective view of a sixth embodiment of engaging structures that are flat with angled hooks. The center of each post is on a line parallel to the nearest body edge. The hook is angled to be on a line from the center of the post of a hook to the quarter point for the side of the array. Each holder 10 is shown with body portion 20, tail portion 30, described engaging structures 190, and optional divider 240.

In the embodiment in FIG. 1, first array 110, second array 120, first edge 150, and second edge 170 are parallel or substantially parallel (to each other). However, other arrangements are possible. For example, each of first and/or second arrays may extend in a diagonal direction with respect to upper and lower ends and first and second edges. In some embodiments, each of first and second arrays is linear, that is the engaging structures are disposed in a straight line or substantially in a straight line. However, in other embodiments, the engaging structures in each array may be disposed on an arc, for example and arc about $M_1$, $M_2$, $Q_1$, or $Q_2$.

In embodiments, first and second edges are parallel or substantially parallel to each other, and each of first and second arrays is linear, and at an angle, y to first and second edges. In such embodiments, the distance between the first array and first edge 150 proximal to lower end 80 is less than the distance from the first array to first edge 150 proximal to upper end 70. The distance between the second array and second edge 170 proximal to lower end 80 is less than the distance between the second array and second edge 170 proximal to upper end 70. Stated differently, as viewed in the aspect shown in FIG. 1, in such embodiments the first array extends from bottom left to top right and is located between the first edge and the first wrap area, and the second array extends from bottom right to top left and is located between the first wrap area and the second edge. In some such embodiments, y is 0°, in embodiments, 10°, in embodiments 15°, in embodiments 20°, in embodiments 30°, in embodiments 40°, in embodiments 45°, in embodiments 50°, in embodiments 60°, in embodiments 70°.

In embodiments, each array of first array 110 and/or second array 120 comprises or consists of one post, in embodiments two engaging structures, in embodiments three engaging structures, in embodiments four engaging structures, in embodiments five engaging structures, in embodiments six engaging structures, in embodiments seven engaging structures, in embodiments eight engaging structures, in embodiments nine engaging structures, or in embodiments ten engaging structures.

In the embodiment shown in FIG. 1: first edge 150 and second edge 170 are parallel or substantially parallel to each other, body portion 20 defines maximum width W, and base 140 defines length L. The size of holder 10 is not particularly limited. Stated differently, the holder can be scaled to accommodate longer straps, larger hooks, and more straps.

In embodiments, L is 8 inches to 36 inches, in embodiments 8 inches to 30 inches, in embodiments 8 inches to 24 inches, in embodiments 10 inches to 16 inches, in embodiments about 12 inches, or in embodiments 12 inches.

In embodiments, W is 5 inches to 24 inches, in embodiments 5 inches to 20 inches, in embodiments 5 inches to 16 inches, in embodiments 7 inches to 11 inches, in embodiments 7 inches to 9 inches, in embodiments about 8 inches, or in embodiments 8 inches.

In embodiments, the ratio of L:W is about 3:1 to about 1:1, in embodiments about 2:1 to about 1:1, or in embodiments about 3:2.

In some embodiments, engaging structures 130 are evenly spaced in array 110 and/or in array 120. In some such embodiments, spacing between adjacent engaging structures $A_2$ and $A_3$ is about 4 inches to about 1 inch, in embodiments about 3 inches to about 1 inch, or in embodiments about 2.5 inches. However, other dimensions for $A_2$ and $A_3$ are possible. $A_2$ and $A_3$ can be larger or smaller depending on the hook size. Indeed, each array can include more than or less than three engaging structures, as set forth herein.

Further, the spacing between adjacent engaging structures in each array can differ from one pair of adjacent engaging structures to another, so that the holder can accommodate hooks of a variety of sizes simultaneously. Stated differently, in some embodiments, engaging structures in an array are not evenly spaced.

Referring to FIG. 1: In embodiments, $A_1$ is 0.5 inches to 2 inches, or in embodiments about 1 inch.

In embodiments, $A_2$ is 2 inches to 5 inches, in embodiments 2 inches to 4 inches, in embodiments 2 inches to 3 inches, or in embodiments about 2.5 inches. In embodiments, $A_3$ is 2 inches to 5 inches, in embodiments 2 inches to 4 inches, in embodiments 2 inches to 3 inches, or in embodiments about 2.5 inches. In embodiments, $A_4$ is about 2 inches to about 6 inches, in embodiments about 2 inches to about 5 inches, in embodiments about 2 inches to about 4 inches, or in embodiments about 3 inches.

In embodiments, as shown in FIG. 1, body portion 20 defines a maximum length B in the longitudinal direction that is the distance between upper end 70 and lower end 80.

In embodiments, as shown in FIG. 1, tail portion defines a maximum length T in the longitudinal direction that is the distance between lower end 80 of the body portion and lower end 40, wherein L=B+T. In embodiments, the ratio B:T is 4:1 to 1:1, in embodiments 4:1 to 2:1, or in embodiments about 3:1.

In embodiments, waist 100 defines a traverse width, ω, of about 3 inches to about 6 inches, in embodiments about 4 inches to about 5 inches, in embodiments about 4 inches to about 4.5 inches, in embodiments about 4.4 inches, or in embodiments about 4.375 inches.

In embodiments width $S_1$ of first wrap edge 300 in a transverse direction is about 5 inches to about 1 inch, in embodiments about 4 inches to about 2 inches, or in embodiments about 3 inches.

In embodiments, width $S_2$ of second wrap edge 270 is the same or substantially the same as width $S_1$ of first wrap edge 300.

In embodiments width $S_2$ of second wrap edge 270 in a transverse direction is about 5 inches to about inch, in embodiments about 4 inches to about 2 inches, or in embodiments about 3 inches.

In embodiments, leg span $S_3$ (transverse distance between legs 290 at lower end 40) is about 2 inches to about 6 inches, in embodiments about 3 inches to about 5 inches, in embodiments about 3 inches to about 4 inches, or in embodiments about 3.75 inches.

Span $S_4$ is width of first recess 50 at upper end 70 of body portion.

In embodiments span $S_4$ is equal to or approximately equal to leg span $S_3$.

In embodiments, span $S_4$ (transverse width of first recess 50 at upper end 70) is about 2 inches to about 6 inches, in embodiments about 3 inches to about 5 inches, in embodiments about 3 inches to about 4 inches, or in embodiments about 3.75 inches.

Span $S_5$ is the width of tail portion 30 at lower end 40.

In embodiments, depth $D_1$ (depth in the longitudinal direction) of first recess 50 is 0.5 inches to about 5 inches, in embodiments about 1 inch to about 4 inches, in embodiments about 1 inch to about 3 inches, in embodiments about 1 inch to about 2 inches, or in embodiments about 1.5 inches.

In embodiments, depth $D_2$ (depth in the longitudinal direction) of second recess 60 is 0.5 inches to about 5 inches, in embodiments about 1 inch to about 4 inches, in embodiments about 1 inch to about 3 inches, in embodiments about 1 inch to about 2 inches, or in embodiments about 1.5 inches. In some embodiments, for example the embodiment shown in FIG. 1, $D_2$ is less than T. However, in other embodiments, $D_2$ is greater than T, that is second recess 60 extends into body portion 20.

With reference to FIG. 1 and further reference to FIG. 2: FIG. 2 is a schematic side view of the holder embodiment depicted in FIG. 1. In the embodiments shown in the drawings, for example FIG. 2, base 140 is planar or substantially planar and defines thickness t. In embodiments, thickness t is about 0.05 inches to about 1 inch, in embodiments about 0.05 inches to about 0.5 inches, in embodiments about 0.1 inches to about 0.5 inches, in embodiments about 0.1 inches to about 0.3 inches, in embodiments about 0.1 inches to about 0.2 inches, in embodiments about 0.13 inches to about 0.18 inches, in embodiments about 0.16 inches, in embodiments about 0.125 inches, or in embodiments 0.125 inches.

In embodiments, the ratio t/W is about 0.005 to about 0.1, in embodiments about 0.005 to about 0.05, in embodiments about 0.01 to about 0.02, or in embodiments about 0.015 to about 0.02.

In embodiments, thickness t is about 0.125 inches or is 0.125 inches and the base comprises, consists of, or consists essentially of polyvinyl chloride (PVC). In embodiments, the PVC is unplasticized PVC (u-PVC).

Each engaging structure 130 extends from top surface 220 in away from top surface. Each engaging structure 130 comprises, consists of, or consists essentially of a post or protruding element extending upward from the body and topped with an engaging element that protrudes at in least in a partial manner outward. In the drawings, each post extends vertically away from the top surface and is perpendicular or substantially perpendicular to the top surface. However, in embodiments the post can be set at an angle to the vertical direction, for example the post of an engaging structure can extend from the top surface and point away from lower end 80 of the body portion and/or towards first edge 150 or second edge 170. The post may have a shape that ranges from cylindrical and tubular to flat. Cylindrical may be hollow or solid.

In embodiments, for example the embodiment shown in FIG. 1 and FIG. 2, each engaging structure comprises post of engaging structure 180 and cap of engaging structure 185. Cap of engaging structure 185 is a portion of engaging structure 130 that is wider in at least one dimension parallel to top surface 220 than post of engaging structure 180. In the embodiment shown in FIG. 1 and FIG. 2, cap is disc shaped. However, other shapes are possible with the proviso that cap of engaging structure 185 is wider in in at least one dimension parallel to top surface 220 than post of engaging structure 180. For example, in embodiments the cap is disc-shaped but defines a missing segment.

In other embodiments (not shown in the drawings), each engaging structure includes a post that widens towards the end of the post opposite to the base. In such embodiments, the width of the post in a direction parallel to the top surface of the base gradually increases with distance from the top surface. In embodiments, the post has a conical or frustoconical shape, with the wider portion opposite to the top surface of the base. In such embodiments, the conical or frustoconical shape is straight sided or radiused (i.e., flared).

In some embodiments, a cap is not present, as it is not necessary because a conical post provides a widening in the engaging structure that assists in preventing the hook of a strap from disengaging with the engaging structure by slipping off the post.

In some embodiments, base 140, first array 110, and second array 120 are a single piece, that is during the manufacturing of the holder, the base and engaging structures are molded, cast, or otherwise formed as a single piece.

In embodiments, the engaging structures are formed in place during the manufacturing process of holder 10, for example by molding, casting, bonding, and/or welding. In other embodiments, engaging structures 130 are attached to base 140. In some such embodiments, different materials are used to form the base 140 and engaging structures 130; thus, for example, base 140 is formed from a thermoplastic while engaging structures 130 are formed from a metal. In some such embodiments, the post of engaging structure 180 of each engaging structure passes through a hole defined by base 140 and is affixed to base 140 by means known in the art. For example, post of engaging structure 180 may define a screw thread, and nuts may be screwed onto the post on opposing top and bottom sides of base 140 and fastened against top surface 220 and bottom surface 230. Alternatively, post of engaging structure 180 is affixed to base 140 using an adhesive material.

In embodiments, the holder of the first embodiments further comprises a loop encircling waist 100. In embodiments, the loop is selected from a loop of webbing, a loop of elastic cord (a bungee loop), a loop of string, and a loop of ribbon. With reference to FIG. 1, the loop defines a circumference less than $2W+2t$ and less than $2S_5+2t$. In the case of an elastic loop such as a bungee loop, the loop defines a circumference less than $2W+2t$ and less than $2S_5+2t$ in its un-extended state.

In embodiments, the loop is tightened around the waist so that the loop is under a non-zero tension. In embodiments, the loop is a cord, webbing, string, or lock tie (zip tie). In some embodiments, the loop is a bungee loop 100. Bungee loop 100 is a loop of elastic material (bungee cord) that can be stretched by hand and is designed and adapted and sized to stretch over legs 290 and provide tension when stretched over waist 100.

In embodiments, there is provided a kit, the kit comprising, consisting of, or consisting essentially of a first component and a second, separate, component. In embodiments, the first component comprises, consists of, or consists essentially of any one of the embodiments of a holder as described herein. In embodiments, the second component comprises, consists of, or consists essentially of any one or more loops as described herein.

Figure 9A:
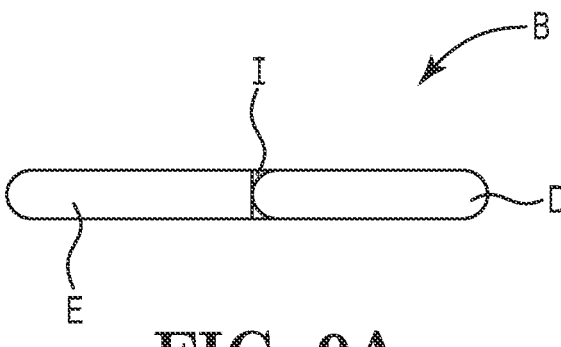
FIGS. 9A and 9B are side and front views, respectively, of a type of S-hook.
Figure 9B:
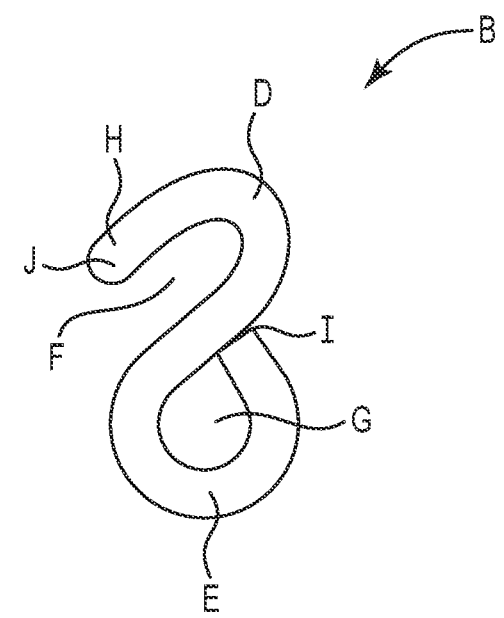
Figure 10:
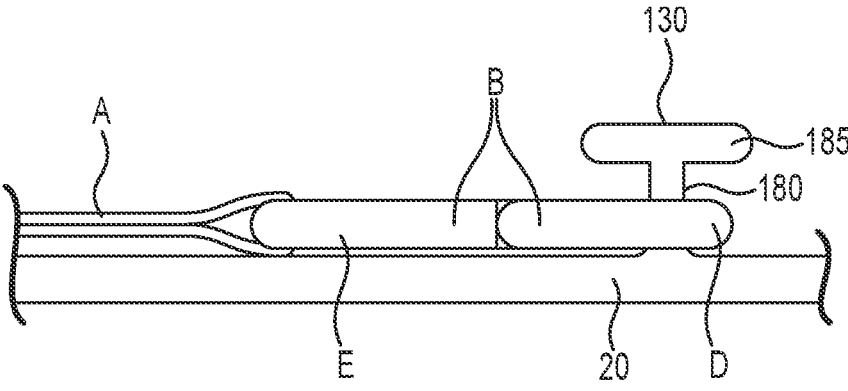
FIG. 10 is a side view of the S-hook shown in FIG. 9A engaged with the attaching element shown in FIG. 1.

The holder of the first embodiments is particularly well suited to hold S-hook terminated straps, D-rings, snap hooks, carabiners, and the like. S-hooks are well-known in the art. One example of an S-hook is shown in FIG. 9A (a lateral aspect) and FIG. 9B (a vertical aspect). As shown in FIG. 9A, S-hooks are relatively flat, and bend D of an S-hook B can engage with post 180 of engaging structure 130, while the hook lies parallel to top surface 220 and/or between 0° and 45° to top surface 220, as shown for example in FIG. 10 and FIG. 3.

Referring to FIG. 3, FIG. 3 includes five S-hook terminated straps wound thereon. Each strap A includes an S-hook B attached thereto. Each engaging structure 130 is positioned, designed, and adapted to receive and engage with an S-hook. Each S-Hook B is hooked over a separate post of engaging structure 180. Each cap of engaging structure 185 (if present) assists in preventing disengagement of an S-hook from a post.

With reference to a single strap: S-Hook B is engaged with an engaging structure 130, by hooking the S-hook over post of engaging structure 180. The strap A is positioned so that it leads from the S-hook to second recess 60, and the strap is tensioned and wound into second recess 60, wrapped around second wrap edge 270, then through second wrap area 95, then through first recess 50 and around first wrap edge 300, through first wrap area 90, and into second recess 60, where it is wound around second wrap edge 270 and thence back to second wrap area 95. In that fashion, wrapping is continued as long as necessary to wrap the whole strap, thereby providing successive loops of the strap through first wrap area 90, around second wrap edge 270, through second wrap area 95, and around first wrap edge 300 back to first wrap area 90. In embodiments, sufficient tension is applied during winding that large loops around first wrap edge 300 and/or second wrap edge 270 are avoided.

In embodiments, wrapping is continued in the above-described fashion around the winding track until the entire length of the strap is disposed around the holder.

When one or more straps have been wound around holder 10 as described, a loop such as bungee loop C is positioned encircling and tensioned around waist 100 and the straps wound onto the holder.

In some embodiments, bungee loop C is positioned as follows: A bungee cord is looped around waist 100, stretched, and the two ends fasted and/or tied together. In other embodiments, bungee cord is already fashioned into bungee loop C, the bungee loop is stretched over legs 290, and slid until bungee loop C encircles waist 100 and all straps passing thereover.

Advantageously and unexpectedly, waist 100 holds a loop such as the bungee loop C in place encircling the waist, and the loop such as the bungee loop C thus secured around waist 100 prevents straps from unwinding, prevents the straps from sliding over one another, and prevents the straps becoming un-tensioned, thereby holding the wound straps securely to holder. The loop is securely disposed around the waist, encircles the waist, and held at or proximal to the waist, because the distance between opposing sides of the holder is at a minimum at the waist and the loop defines a circumference less than the width of the base proximal to the waist. The loop traverses the winding track transversely and encompasses straps wound onto the winding track. Accordingly, the loop retains and secures loops of straps wound onto the winding track and prevents unintended unwinding of the straps.

In embodiments, there is provided a method, the method comprising, consisting of, or consisting essentially of: (i) Providing a holder of the first embodiments and at least one hook-terminated strap, the hook-terminated strap comprising a webbing belt and a hook; (ii) engaging the hook of the hook-terminated strap with an engaging structure of the holder; (iii) passing the strap under tension over the waist, through the second recess and around the second wrap edge, over the second wrap area, through the first recess and around the first wrap edge, and over the first wrap area; and (iv) positioning and tensioning a loop around the waist, whereby the loop is under tension and encircles the waist and the strap. In embodiments, step (iii) is repeated any number of times from 0 times to 50 times, in embodiments, from 0 times to 40 times, in embodiments from 0 times to 30 times, in embodiments from 0 times to 20 times, in embodiments from 0 times to 10 times, in embodiments from once to 50 times, in embodiments from once to 40 times, in embodiments from once to 30 times, in embodiments from once to 20 times, or in embodiments from once to 10 times.

In embodiments, the hook-terminated strap is an S-hook terminated strap, a D-ring terminated strap, a snap hook terminated strap, or a carabiner-terminated strap.

In embodiments, the cord is a bungee cord.

In some embodiments, the loop is positioned by tying and/or positioning and tensioning a cord or lock tie around waist and all windings of the strap, thereby forming the loop and encircling the waist and strap windings passing over the waist. In other embodiments, the loop is positioned by stretching an extensible loop of cord such as a bungee loop around the legs and sliding the loop to the waist.

In embodiments, the transverse width of the tail portion of the base tapers from the lower end of the base towards the waist and reaches a minimum at the waist.

In embodiments, the top and bottom surfaces of the base are planar or substantially planar and coplanar or substantially coplanar to each other, whereby the base defines a uniform or substantially uniform thickness, t, between the top and bottom surfaces.

However, in holder embodiments the thickness of the base, t, (the distance between the upper surface of the base and the lower surface of the base) is greater proximal to the first edge of the body portion, the second edge of the body portion, the upper end of the body portion, the lower end of the body portion, and/or any other edge of the holder than opposite thereto. Stated differently, the base gradually increases thickness approaching an edge thereof. This arrangement has the advantage of conferring rigidity to the base. The average thickness of the base can be decreased, thereby entailing savings in materials constituting the base.

In embodiments, the base is made from (comprises, consists of, or consists essentially of) polyethylene, polypropylene, polycarbonate, polyvinyl chloride, polycarbonate, polyamide, polyurethane, aluminum, steel, magnesium, zinc, fiberglass composite, wood, plywood, fiberboard, or any combination thereof.

The base may be fabricated by molding, stamping, casting, cutting, 3D printing, or any combination thereof.

As noted herein, in some embodiments, the engaging structures may be made as a single piece with the base.

In embodiments, the optional divider(s) of the first and/or second embodiments is/are made as a single piece with the base.

In embodiments, the base comprises, consists of, or consists essentially of a plastic material such as polyethylene, polypropylene, polycarbonate, polyvinyl chloride, polycarbonate, polyamide, polyurethane or any combination thereof.

In embodiments, the base comprises, consists of, or consists of a cellulosic material such as wood, plywood, or fiberboard.

In embodiments wherein the base does not comprise a molded plastic, the engaging structures may comprise, consist of, or consist essentially of a non-plastic material such as a metal such as steel.

In embodiments, the base may include one or more optional dividers; in embodiments one optional divider, in embodiments two optional dividers, in embodiments three optional dividers, in embodiment four optional dividers. A variety of arrangements of the one or more optional dividers is possible. In some embodiments wherein the base includes one or more optional dividers, at least one of the one or more optional dividers is located on the first wrap area.

In some embodiments, one or more further optional dividers are located on the bottom surface of the base extending therefrom but outside of the second wrap area. In such embodiments, optional dividers stiffen and/or strengthen the base.

In embodiments, optional dividers are linear, e.g., run longitudinally as shown in the drawings. However other shapes and positions are possible.

In some embodiments the first and second wrap edges as described herein are right angled in cross-section; that is the top surface of the base adjoins the first wrap edge, the second wrap edge, or both the first and second wrap edges at 90° or at about 90° (square), and the bottom surface meets the first wrap edge, the second wrap edge, or both the first and second wrap edges at 90° or at about 90° (square). However, in embodiments, the first wrap edge, the second wrap edge, or both the first and second wrap edges are chamfered, radiused, rounded, half-round, or otherwise curved. In embodiments, the first and second wrap edges are not square. In embodiments, the first and second wrap edges are both rounded, that is the top surface of the base transitions to the wrap edge and the wrap edge transitions to the bottom surface without sharp corners or junctions. Avoiding sharp corners or junctions has the advantage that the frictional wear of strap webbing due to movement of the strap webbing relative to the holder is minimized.

EXAMPLES

Example 1—a Holder with a First Embodiment of
Engaging Structures with Posts Topped with Round
Caps in Straight Lines Attached to a Base A holder was made with the design shown in FIG. 1 and FIG. 2 except without divider 240. Referring to FIG. 2, the base was made of three-ply plywood of thickness, t, about $^3\!/_{19}$ inches (about 4 mm). Referring to FIG. 1, dimensions were as follows: W was about 8 inches, L was about 12 inches, B was about 9⅛ inches, T was about 2⅞ inches, $A_1$ was about 1 inch, $A_2$ was about 2½ inches, $A_3$ was about 2½ inches, $A_4$ was about 3⅛ inches, $D_1$ was about 1½ inches, $D_2$ was about 1½ inches, ω was about 4⅜ inches, $S_1$ was about 3 inches, $S_2$ was about 3 inches, $S_3$ was about 3⅞ inches, $S_4$ was about 3⅞ inches. The transverse distance from the center of each engaging structure to the nearest of edges 150 and 170 was about one inch. The post of each engaging structure was a screw affixed to the base with a pair of opposing nuts on the top surface and the bottom surface of the base. The cap was a steel washer, fixed onto post with a nut whereby the washer was juxtaposed between the nut and the head of the screw.

A bungee loop was disposed around the waist and the ratchet straps, and the holder comfortably and securely held six ratchet straps terminated with S-hooks, wherein the S-hooks were of various sizes and curvatures. Although the webbing of each strap was relatively flat and slippery and turns of the strap easily slipped laterally over each other, the ratchet straps were held securely by the bungee cord around the waist of the holder, and the ratchet straps were securely held on the holder.

The S-hook of each ratchet strap could be positioned with the tip of the S-hook inside as shown in FIG. 3, but the S-hook of each ratchet strap could be positioned with the tip of the S-hook outside also. Either way, each ratchet strap was held securely.

Example 2—a Holder with a Third Embodiment of
Engaging Structures with Posts Topped with
Oblong Caps Affixed to a Base A holder was made with the design shown in FIG. 4 and similar to FIG. 1 but with rounded corners, oblong caps and made of plastic instead of wood. The holder was made of high-density polyethylene (HDPE) of thickness about ⅛ inches (about 3.2 mm). Referring to FIG. 4, dimensions were as follows: Width was about 8 inches, Length was about 12 inches, Body was about 9¼ inches, Tail was about 2¾ inches, $A_1$ was about 1 inch, $A_2$ was about 2½ inches, $A_3$ was about 2½ inches, $A_4$ was about 3⅛ inches, $D_1$ was about 1½ inches, $D_2$ was about 1½ inches, ω was about 4⅜ inches, $S_1$ was about 3 inches, $S_2$ was about 3 inches, $S_3$ was about 3⅞ inches, $S_4$ was about 3⅞ inches. The transverse distance from the center of each engaging structure to the nearest of the edges was about one inch. The post of each engaging structure had a diameter of inch and a height of ⅝ inch and was inserted into a hole in the base and affixed to the base with a wafer head screw. The bottom of the post was reduced in size and made square to fit into a square hole in the base to prevent excessive rotation. The cap w oblong with a thickness of ⅛ inch, a width of ½ inch and a length of ⅝ and was affixed to the top of the post with hot air welding. From the top down on each side the oblong cap was pointed outward at an angle between vertical and a line passing from the quarterpoint on its side through the center point of the post of 17 degrees, 23 degrees and 27 degrees. The optional divider had a height of ¾ inch, a length of 7¾ inches and a thickness of ⅛ was ⅛ inch thick and was hit air welded to the base.

What I claim is:

1. A holder comprising:
   a base comprising a body portion, a tail portion, a lower end of the base, and top and bottom major surfaces defining a thickness therebetween,
      the body portion defining opposing upper and lower ends, and opposing first and second edges,
      the tail portion attached to the lower end of the body portion to form an attachment and extended to the lower end of the base,
      the attachment which is a locally minimum width in the base further defining a waist,
      the base defining a first recess in the upper end of the body portion and a second recess in the lower end of the base and with an acute trapezoidal shape, wherein the top surface includes a first wrap area between the first recess and the second recess and the bottom surface includes a second wrap area between the first recess and the second recess;
   a first array of engaging structures attached to the top surface of the body portion between the first edge and the first wrap area and extending away from the top surface; and
   a second array of engaging structures attached to the body portion between the second edge and the first wrap area and extending away from the top surface.

2. The holder of claim 1, wherein the top and bottom surfaces are substantially coplanar, the upper and lower ends are substantially parallel to each other, and the first and second edges are substantially parallel to each other.

3. The holder of claim 1, the holder further comprising a loop encircling the waist, wherein the loop is selected from a bungee loop, a zip tie, an elastic band, and a loop of cord.

4. The holder of claim 1, wherein each of the first and second recesses defines an isosceles trapezoidal shape.

5. The holder of claim 1, wherein each of the first array and the second array consists of three engaging structures.

6. The holder of claim 1 where the engaging structures are unified with the body portion.

7. The holder of claim 1 wherein the engaging structures are from a group consisting of a post with a cap, a closed circle, a straight hook and an angled hook.

8. The holder of claim 1, wherein the first array is substantially parallel to the first edge of the body portion, and the second array is substantially parallel to the second edge of the body portion.

9. The holder of claim 1, wherein the first recess includes a first wrap edge, the second recess includes a second wrap edge, wherein the first and second wrap edges are substantially linear, and wherein the first wrap edge, the second wrap edge, the upper end of the body, and the lower end of the body are substantially parallel to each other.

10. The kit of claim 9, the kit further comprising a hook terminated strap.

11. The holder of claim 1, wherein the base is planar or substantially planar, and each of the first array of engaging structures and the second array of engaging structures extends substantially perpendicularly from the top surface.

12. A kit comprising a first component and a separate second component, wherein the first component comprises the holder of claim 1, and the second component comprises a bungee loop.

13. A method of holding a hook-terminated strap on a holder, the method comprising:

(i) providing (1) a holder comprising a base comprising a body portion, a tail portion, a lower end of the base, and top and bottom major surfaces defining a thickness therebetween, the body portion defining opposing upper and lower ends, and opposing first and second edges, the tail portion attached to the lower end of the body portion to form an attachment and extended to the lower end of the base, the attachment which is a locally minimum width in the base further defining a waist, the base defining a first recess in the upper end of the body portion and a second recess in the lower end of the base and with an acute trapezoidal shape, wherein the top surface includes a first wrap area between the first recess and the second recess and the bottom surface includes a second wrap area between the first recess and the second recess;

a first array of engaging structures attached to the top surface of the body portion between the first edge and the first wrap area and extending away from the top surface; and a second array of engaging structures attached to the body portion between the second edge and the first wrap area and extending away from the top surface; and (2) at least one hook-terminated strap;

(ii) engaging the hook with an engaging structure;

(iii) positioning the strap so that it passes, in order, from the attaching element over the waist to the second recess;

(iv) positioning the strap so that it further passes, in order, through the second recess, over the waist, through the first recess, and over the waist; and (v) repeating step (iv) any number of times from 0 to 30 times.

14. The method of claim 13 wherein the holder further comprises a loop encircling the waist, wherein the loop is selected from a bungee loop, a zip tie, an elastic band, and a loop of cord, and the method further comprises the step of (vi) positioning and tensioning a loop around the waist and at least some windings of the strap.

* * * * *